United States Patent [19]

Jay

[11] Patent Number: 4,924,768
[45] Date of Patent: May 15, 1990

[54] MULTI-PURPOSE BAKING AND ROASTING RACK

[75] Inventor: Murray Jay, Woodsburgh, N.Y.

[73] Assignee: Gemco-Ware Inc., Freeport, N.Y.

[21] Appl. No.: 160,206

[22] Filed: Feb. 25, 1988

[51] Int. Cl.⁵ .............................................. A47J 43/18
[52] U.S. Cl. ........................................ 99/425; 99/419; 99/446; 99/448; 211/125; 211/181; D7/409
[58] Field of Search ................ 99/419, 444, 446, 448, 99/449, 425, 426; 211/125, 181, 195, 59.1; D7/409; D6/566

[56] References Cited

U.S. PATENT DOCUMENTS

| | | | |
|---|---|---|---|
| 1,220,650 | 3/1917 | Gore | 211/125 |
| 1,319,422 | 10/1919 | Scharf | 211/125 |
| 1,698,762 | 1/1929 | Martin | 211/125 |
| 2,111,456 | 3/1938 | Markle | 99/419 X |
| 2,584,295 | 2/1952 | Sanzenbacher | 99/419 |
| 3,379,118 | 4/1968 | Perez | 99/419 |
| 3,931,758 | 1/1976 | Blake | 99/419 |
| 4,633,773 | 1/1987 | Jay | 99/426 |
| 4,709,626 | 12/1987 | Hamlyn | 99/426 |

*Primary Examiner*—Harvey C. Hornsby
*Assistant Examiner*—K. L. O'Leary
*Attorney, Agent, or Firm*—Lilling & Greenspan

[57] ABSTRACT

A multi-purpose baking and roasting rack which includes a drip pan and a plurality of upwardly directed generally vertically oriented skewer rods positioned above the interior surface of the drip pan each adapted to support and pierce a food item to be baked or roasted. The skewer rods each form part of a skewer assembly which are mounted on the drip pan, with associated or cooperating skewer assemblies being arranged and substantially orthogonal planes and include indentations therein at the points where the skewer assemblies cross to stabilize the skewer rods in relation to each other, thereby providing a generally rigid construction when assembled for use which facilitates the reliable and safe use of the rack.

17 Claims, 2 Drawing Sheets

MULTI-PURPOSE BAKING AND ROASTING RACK

BACKGROUND OF THE INVENTION

1. Field of the Invention

The invention generally relates to baking and roasting utensils, and more specifically to a multi-purpose baking and roasting rack.

2. Description of the Prior Art

Numerous designs have been proposed for supports or racks for roasting poultry in a conventional oven. Typically, the known designs utilize a number of substantially closed wire loops which cooperate with each other to define a hollow bulbous-shaped member which protrudes upwardly from a drip pan or cooking tray. The bulbous-shaped former member is inserted into the cavity of the bird so that the heat is more evenly distributed and fat and grease are permitted to drip directly into the pan.

For example, U.S. Pat. No. 4,633,773, issued to the assignee of the subject application, discloses a holder for roasting poultry which includes two bent wire interlocking elements, the free ends of which are attached to the peripheral rim of the drip pan. Each of the two cooperating bent wires form a central, upwardly extending loop which are suitable for insertion into the cavity of the poultry to be roasted. A roasting support for a chicken is also disclosed in U.S. Pat. No. 3,392,665. Chicken roasting rack designs without drip pans ar shown in U.S. Design Pat. Nos. 253,156 and 270,608. In each of the aforementioned patents, a central bulbous-shaped member is formed which can only be utilized for insertion into the cavity of a chicken or like fowl or bird. A stand for roasting fowl which has a similar disadvantage and which is formed of flat plates instead of bent wires is disclosed in U.S. Pat. No. 4,450,759.

In U.S. Pat. No. 4,557,188, a rack is disclosed for cooking foods, such as artichokes. Here, again, the rack is formed of a pair of wires which are bent and closed on each other so as to form a cradle for an item of food which can be received or nested on the rack.

Because the known racks or stands are designed to create a single central bulbous-shaped member or a single cradle, only a single chicken, artichoke, or the like can be roasted or baked at any one time.

SUMMARY OF THE INVENTION

Accordingly, it is an object of the present invention to provide a multi-purpose rack which is suitable both for baking and roasting.

It is another object of the present invention to provide a rack which can be used to bake and roast a single, large item of food, such as a chicken or roast, or a plurality of smaller items of food, such as potatoes, apples, and the like.

It is still another object of the present invention to provide a multi-purpose rack of the type aforementioned which can be easily disassembled and collapsed for cleaning and storage.

It is yet another object of the present invention to provide a multi-purpose rack which is simple in construction and economical to manufacture.

It is a further object of the present invention to provide a multi-purpose rack of the type under discussion which is suitable for low fat cooking.

It is still a further object of the present invention to provide a multi-purpose rack which seals in juices and eliminates fats during roasting.

In order to achieve the above objects, as well as others which will become apparent hereafter, a multi-purpose baking and roasting rack in accordance with the present invention comprises a drip pan having a raised peripheral rim circumferentially extending about a downwardly recessed interior surface. A plurality of generally vertically oriented skewer rods are positioned above said central surface, each adapted to pierce and support a food item to be baked or roasted. Connecting means is provided for connecting said skewer rods to said peripheral rim, and stabilizing means is provided for stabilizing said skewer rods in relation to themselves and to said drip pan to provide a generally rigid support construction which facilitates the reliable and safe use of the rack.

According to one presently preferred embodiments, said skewer rods are formed from two similarly shaped first rigid wire elements, each first rigid wire element being bent within a plane and being generally U-shaped to form two upwardly extending arms which define one pair of spaced generally parallel skewer rods and having an intermediate connecting rod portion extending between the lower ends of said skewer elements. Said connecting means comprises a second wire element connected to an intermediate connecting rod portion of an associated wire element, each second wire element being bent to form outwardly and downwardly flaring leg members having lowermost free ends detachably connectable to said peripheral rim.

According to another presently preferred embodiment, said skewer rods are formed from similarly shaped rigid wire elements each having a first generally straight portion which forms a skewer rod and a second portion bent at an angle in relation to said first portion to form a supporting leg which flares downwardly and across said interior surface towards said rim when the associated straight portion is vertically disposed in its normal position for use. Gripping ends are provided at the lower ends of said supporting legs, said peripheral rim having a plurality of holes therein, each dimensioned to securely receive a gripping end of another wire element.

BRIEF DESCRIPTION OF THE DRAWINGS

The foregoing and other important objects of the present invention will become more apparent during the following disclosure which will be made by reference to the drawings, in which.

DESCRIPTION OF THE PREFERRED EMBODIMENTS

Figure 1:
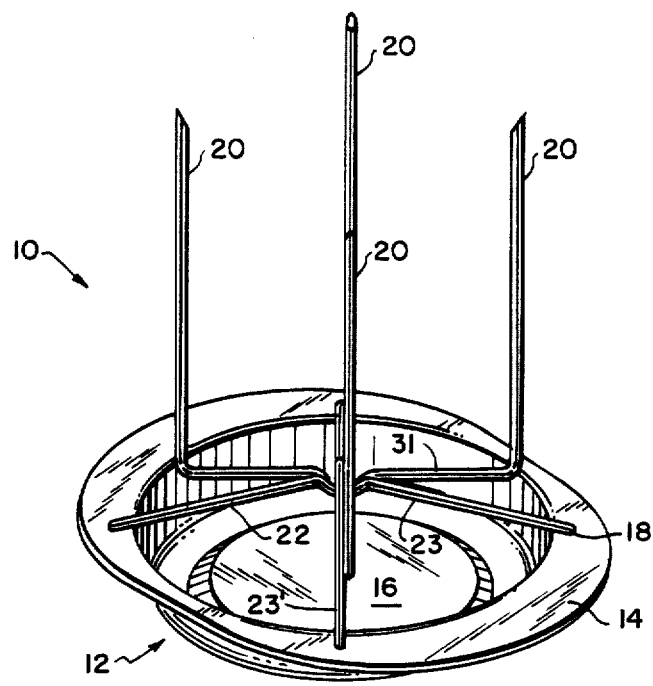
FIG. 1 is a perspective view of a multi-purpose baking and roasting rack in accordance with the present invention, shown assembled and ready to use.

Referring now specifically to the Figures, in which identical or similar parts are designated by the same reference numerals throughout, and first referring to FIG. 1, a multi-purpose baking and roasting rack in accordance with the present invention is generally designated by the reference numeral 10.

The rack includes a drip pan 12 having a raised peripheral rim 14 circumferentially extending about a downwardly recessed interior surface 16. The peripheral rim 14 is provided with a plurality of holes 18 which are spaced from each other about the peripheral rim 14. In the presently preferred embodiment, four holes 18 are disposed about the peripheral rim and are substantially uniformly spaced from each other, although as will become evident from the disclosure that follows, it is possible to utilize more or less holes, limited only by the ability to stabilize the unit as will become more fully apparent hereafter.

Figure 2:
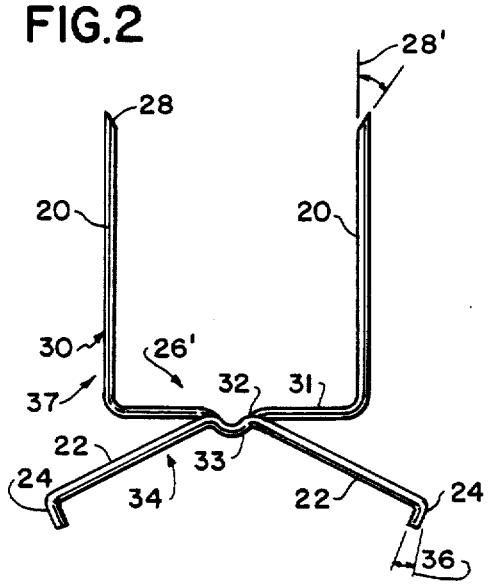
FIG. 2 is a side elevational view of one of the skewer assemblies forming part of the rack shown in FIG. 1.
Figure 3:
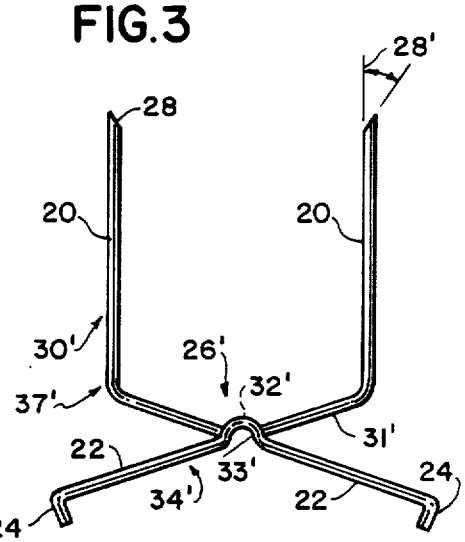
FIG. 3 is a side elevational view of the other skewer assembly forming part of the rack shown in FIG. 1.
Figure 4:
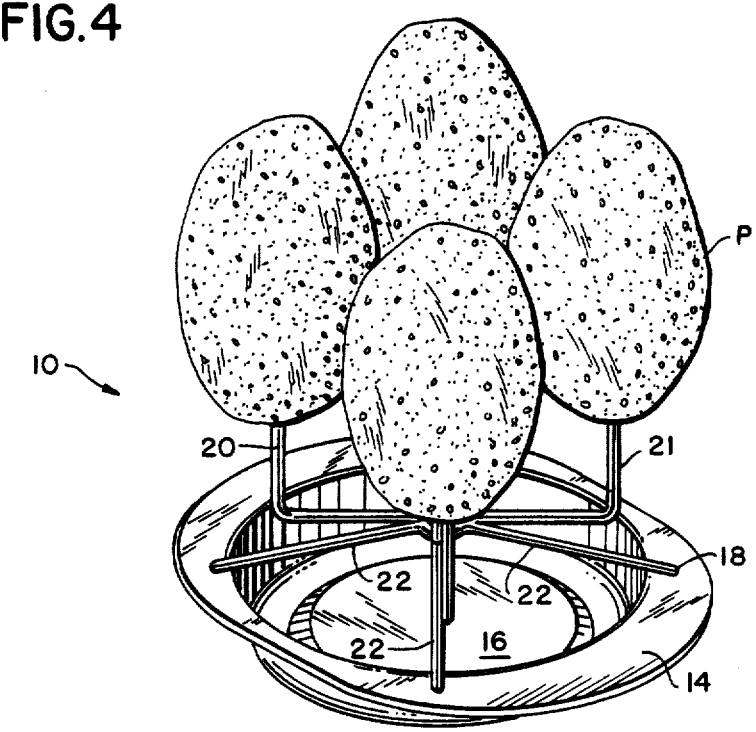
FIG. 4 is similar to FIG. 1, showing four potatoes supported by the rack ready for baking.

Referring to FIGS. 2 and 3, an important feature of the present invention is the provision of generally vertically oriented skewer rods 20 positioned above the interior surface 16, each skewer rod being adapted to pierce and support a food item to be baked or roasted.

Connecting means in the form of outwardly and downwardly flaring leg members 22 are used for supporting and connecting the skewer rods 20 to the peripheral rim 14. The connecting means includes gripping end portions 24 which are adapted to be received within the holes 18 with little clearance to allow the gripping ends 24 to be securely received within the holes 18.

Another feature of the present invention is the provision of stabilizing means, generally designated by the reference numeral 26, 26' for stabilizing the skewer rods 20 in relation to each other and to the drip pan 12 to provide a generally rigid construction of the rack when assembled for use which facilitates the reliable and safe use of the rack. The stabilizing means 26, 26' will be more fully described below.

As should be evident, the multi-purpose rack 10 in accordance with the present invention provides a number of advantages which have not been available with prior art racks. By providing a plurality of separate and distinct skewer rods 20, larger items such as poultry or poultry parts and roasts can be baked or roasted by utilizing all of the skewer rods, which together cooperate to support the item. On the other hand, numerous other smaller food items can be baked or roasted, such as apples, potatoes, shish-kabobs, et cetera (e.g. p in FIG. 5), by mounting each of them on another skewer rod. Notwithstanding added flexibility and versatility, the rack in accordance with the present invention is no more complicated or expensive to manufacture than the prior art racks, and is just as convenient to use, store and package.

A multi-purpose rack in accordance with the present invention can be constructed in a number of different ways while still providing the same features and advantages. For example, referring to FIGS. 2 and 3, one construction shows the skewer rods 20 to be formed from two similarly shaped first rigid wire elements 30, 30'. Each rigid wire element 30, 30' is shown bent within a vertical plane and is generally U-shaped to form two upwardly extending arms which define one pair of spaced generally parallel skewer rods 20 and having an intermediate connecting rod portion 31, 31' which extends between the lowermost ends of the skewer elements 20.

In the embodiment of FIGS. 2 and 3, the connecting means is in the form of a second wire element 34, 34' shown to be in the nature of an inverted generally V-shaped section of wire or rod, which is connected to the intermediate connecting rod portion 31, 31' of an associated first wire element 30. Each wire element 34, 34' is bent to form outwardly and downwardly flaring leg members 22 having lowermost free ends 24 which form the gripping ends which are detachably connectable to the peripheral rim 14. Each free end 24 is shown as a free portion bent to orient the gripping portion in a generally downward and inward direction when an associated skewer rod is arranged in a generally vertically upwardly extending direction. In the presently preferred embodiment, each gripping end 24 is bent at least partially inwardly from the peripheral rim towards the interior surface 16 at an angle 36 to prevent inadvertent withdrawal or removal of a gripping end 24 from a associated hole 18 in the rim 14. While the specific angle 36 that each gripping end forms with the vertical is not critical, it has been found that an angle of approximately 15° in relation to the vertical direction is satisfactory and allows the gripping ends to be easily inserted into associated holes 18 by partial deflection of leg members 22 during assembly. After the gripping ends 24 are received within the holes 18, the leg members 22, 22' revert to their normal positions and grip the drip pan to prevent inadvertent separation.

The mid-portion of each intermediate connection rod portion 31, 31' midway between the skewer rods 20, is joined to the upper portions of the leg members 22, such as by welding. Each U-shaped section 30, 30' and associated inverted V-shaped section 34, 34' are disposed in a substantially common plane and together define a skewer assembly 37, 37'. In use, two skewer assemblies 37, 37' are arranged in substantially orthogonal vertical planes and intersect over a central region of the interior surface 16. At least one of the rigid wires of one skewer assembly 37 in one plane is provided with an indentation 32 over the central region for at least partially receiving, in locking engagement, an intersecting rigid wire of the other skewer assembly 37' in the other plane to form the stabilizing means 26, 26'. In the presently preferred embodiment, each of the rigid wires of each of the skewer assemblies is provided with mating indentations 32, 32'.

The specific cross-sectional dimensions of the rods or wires used is not critical for purposes of the present invention, although it has been found that 8 gauge plated steel rod is suitable for this purpose.

Figure 5:
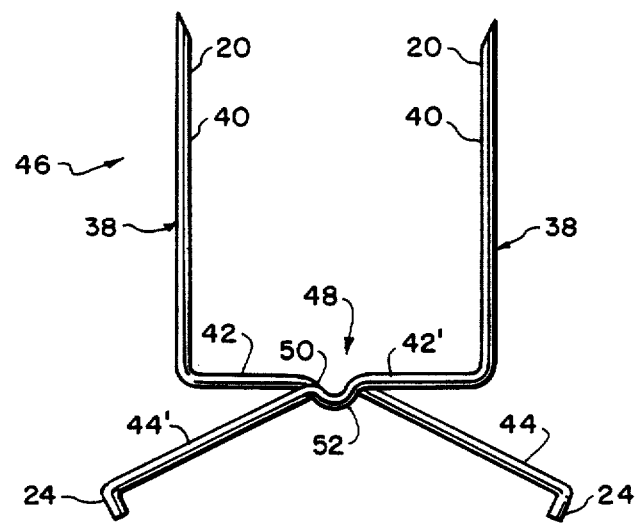
FIG. 5 shows an alternate embodiment of a skewer assembly which can be used to form a rack in accordance with the present invention.

Referring to FIG. 5, another possible construction of the rack assembly is shown which differs slightly from the previously disclosed embodiment, although exhibits the same features and advantages during use.

Here, the skewer rods are formed from similarly shaped rigid wire elements 38, each having a first generally straight portion 40 which forms a skewer rod 20 and a second portion 42 which is shown bent at 90° from the first portion 40. A third portion 44 of the wire element is bent downwardly in relation to the second portion 42. The second and third portions 42, 44 are generally bent at an angle in relation to the first portion 40 to form a supporting leg which flares downwardly and across said interior surface 16 towards the rim 14 when the associated straight portion 40 is vertically disposed in its normal position for use. The first and second portions 40, 42 together generally correspond to the upwardly extending arms 20 and the intermediate connecting rod portion 31, 31' of the previously described embodiment, while the third portion 44 corresponds to the downwardly flaring leg members 22. In each embodiment, the gripping ends 24 are similarly configured and serve the same function.

In the embodiment as shown in FIG. 5, two rigid wire elements 38 are joined to form each of two cooperating skewer assemblies 46. The rigid wire elements of each of the assemblies are arranged in mirror image in relationship to each other substantially within a common plane to dispose each of the skewer rods 20 of each assembly in spaced relationship to each other. The rigid wire elements 38 of each assembly 46 are joined to each other at a connection point substantially mid-way between the skewer rods 20 where associated portions and support legs 42, 44 and 42', 44' cross each other.

As with the first described embodiment, two skewer assemblies 46 are arranged in substantially orthogonal planes, and the stabilizing means 48 consist of an upwardly extending indentation (not shown) in one skewer assembly while a downwardly extending indentations 50, 52 are provided in the other skewer assembly 46. The indentations 50, 52 are shown to be provided in both of the rigid wire elements which form each assembly. The indentations on each assembly are arranged, configured and dimensioned, in the assembled state of the rack, to securely receive the rigid wire elements of the other skewer assembly. While the gripping ends 24 prevent the movements of each skewer assembly along directions substantially parallel to the planes in which they are disposed, pivotal movements of such skewer assemblies are still possible in transverse directions. The stabilizing means 26, 26' and 48, in this case positions and orientations of indentations in the central region of the rack, serve to stabilize the skewer assemblies and prevent such transverse movements to thereby provide a substantially rigid overall support construction during use.

Advantageously, the upper surface of the drip pan 12 is coated with a non-stick easy to clean finish. Such coating, which must be heat-resistant, may be any one of a number of different known synthetic resins, such as a resin marketed by Du Pont under the trademark "TEFLON" or a resin marketed by General Electric under the trade name "POLYCARBONATE".

To facilitate piercing of the food to be mounted on the skewer rods 20, the skewer rods are advantageously tapered at the upper ends, as indicated at the reference numeral 28. The angle 28' is not critical, although an angle of 45° has been found to be satisfactory. As should also be clear, the rack in accordance with the present invention can be made in any size that is desired. For example, a spacing between co-planar skewer rods 20 of approximately 4.2" and a spacing between the gripping ends 24, 24' of 5.625" has been found to be satisfactory.

It is also to be noted that the specific shape of the drip pan is not critical, and such drip pan may take any suitable configuration. In the presently preferred embodiments, the drip pan has a generally circular configuration having a diameter of approximately 6".

When the rack is no longer in use, the wire elements are detachably mounted on the drip pan 12 to permit the rack to be dis-assembled and collapsed. This is done by simply urging the gripping ends 24 from their associated holes 18. This may require an upward and outward force applied to the leg members 22, 22' in order to flex the same and, in essence, increase the separation between the opposing gripping ends 24. Once disassembled, the skewer assemblies, each being planar in nature, can be efficiently stored or packaged.

It will be noted from the above description that the described constructions provide a plurality of skewer rods which are generally arranged along the periphery of the interior surface 16 and are substantially equally spaced from each other to optimize the number and the size of the items of food to be baked o broiled. By ensuring that the skewer rods are above the interior surface 16, and therefore inwardly or interiorly of the peripheral rim 14, this assures that any drippings of fat or grease are collected within the drip pan 12.

While preferred embodiments in accordance with the invention have been illustrated and described, it is understood that various modifications may be resorted to without departing from the scope of the appended claims.

What is claimed is:

1. A multi-purpose baking and roasting rack comprising a drip pan having a raised peripheral rim circumferentially extending about a downwardly recessed interior surface; a plurality of generally vertically oriented skewer rods positioned above said interior surface each adapted to pierce and support a food item to be baked or roasted; connecting means for connecting said skewer rods to said peripheral rim; and stabilizing means for stabilizing said skewer rods in relation to themselves to provide a generally rigid construction when assembled for use which facilitates the reliable and safe use of the rack, wherein said skewer rods being formed from two similarly shaped first rigid wire elements, each first rigid wire element being bent within a plane and being generally U-shaped to form two upwardly extending arms which define one pair of spaced generally parallel skewer rods and having an intermediate connecting rod portion extending between the lower ends of said skewer elements, said connecting means comprising a second wire element connected to an intermediate connecting rod portion of an associated first wire element, each second wire element being bent to form outwardly and downwardly flaring leg members having lowermost free ends detachably connectable to said peripheral rim.

2. A multi-purpose baking and roasting rack as defined in claim 1, wherein a plurality of holes are provided in and spaced from each other about said peripheral rim, each hole being dimensioned to securely receive a lowermost free end of a leg member.

3. A multi-purpose baking and roasting rack as defined in claim 2, wherein each free end comprises a gripping portion bent to orient said gripping portion in a generally downward direction when associated skewer rods are arranged in a generally vertically upwardly extending direction.

4. A multi-purpose baking and roasting rack as defined in claim 3, wherein each gripping end is bent at least partially inwardly from said peripheral rim towards said interior surface to prevent inadvertent withdrawal of a gripping end from an associated hole in said rim.

5. A multi-purpose baking and roasting rack as defined in claim 4, wherein said gripping ends are inwardly inclined approximately 15° in relation to the vertical direction.

6. A multi-purpose baking and roasting rack as defined in claim 1, wherein said two first rigid wire elements are arranged in substantially orthogonal vertical planes and intersect over a central region of said interior surface, at least one of said rigid wires in one plane, being provided with an indentation over said central region for at least partially receive in locking engagement an intersecting rigid wire in the other plane to form said stabilizing means.

7. A multi-purpose baking and roasting rack as defined in claim 6, wherein each of said rigid wires is provided with mating indentations.

8. A multi-purpose baking and roasting rack comprising a drip pan having a raised peripheral rim circumferentially extending about a downwardly recessed interior surface; a plurality of generally vertically oriented skewer rods positioned above said interior surface each adapted to pierce and support a food item to be baked or roasted; connecting means for connecting said skewer rods to said peripheral rim; and stabilizing means for stabilizing said skewer rods in relation to themselves to provide a generally rigid construction when assembled for use which facilitates the reliable and safe use of the rack, said skewer rods being formed from similarly shaped rigid wire elements each having a first generally straight portion which forms a skewer rod and a second portion bent at an angle in relation to said first portion to form a supporting leg which flares downwardly and across said interior surface towards said rim when the associated straight portion is vertically disposed in its normal position for use and having a gripping end, said peripheral rim having a plurality of holes therein each dimensioned to securely receive a gripping end of another wire element.

9. A multi-purpose baking and roasting rack as defined in claim 8, wherein each gripping end comprises a free end portion at the free end of a respective second portion and bent to orient said free end portion in a generally downward direction when an associated skewer rod is arranged in a generally vertical upwardly extending direction.

10. A multi-purpose baking and roasting rack as defined in claim 9, wherein each free end portion is bent at least partially inwardly from said peripheral rim towards said interior surface to prevent inadvertent withdrawal of a gripping end from an associated hole in said rim.

11. A multi-purpose baking and roasting rack as defined in claim 10, wherein said gripping ends are inwardly inclined approximately 15° in relation to the vertical direction.

12. A multi-purpose baking and roasting rack as defined in claim 8, wherein two wire elements are provided and arranged in substantially orthogonal vertical planes and intersect over a central region of said interior surface, at least one of said two wire elements having an indentation for at least partially receiving the other of said two wire elements in locking engagement to form said stabilizing means.

13. A multi-purpose baking and roasting rack as defined in claim 12, wherein each of said two wire elements is provided with mating indentations.

14. A multi-purpose baking and roasting rack as defined in claim 12, wherein said indentation is provided approximately in the middle of said second portion to dispose said indentation in the central region of said interior surface where said wire elements are in closest proximity to each other.

15. A multi-purpose baking and roasting rack as defined in claim 8, wherein two rigid wire elements are joined to form each of two cooperating skewer assemblies, said rigid wire elements of each assembly being arranged in mirror image relationships to each other within a plane to dispose said skewer rods of each assembly in spaced relationship to each other, and said rigid wire elements of each assembly being joined to each other at a connection point substantially midway between said skewer rods where associated supporting legs cross each other.

16. A multi-purpose baking and roasting rack as defined in claim 15, wherein said two skewer assemblies are arranged in substantially orthogonal planes, and said stabilizing means comprises an upwardly extending indentation at said connection point of one skewer assembly and a downwardly extending indentation at said connecting point of the other skewer assembly, the indentation of each skewer assembly being arranged, in the assembled state of the rack, to securely receive the rigid wire elements of the other skewer assembly.

17. A multi-purpose baking and roasting rack as defined in claim 8, wherein said wire elements are detachably mounted in said drip pan to permit the rack to be disassembled and collapsed.

* * * * *